(12) United States Patent
Gopinath et al.

(10) Patent No.: US 8,411,834 B2
(45) Date of Patent: Apr. 2, 2013

(54) DEVICE-TO-DEVICE CALL DISPOSITION

(75) Inventors: Radhakrishnan Gopinath, Alpharetta, GA (US); Douglas David Gravino, Roswell, GA (US); Michael L. Poffenberger, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 366 days.

(21) Appl. No.: 12/767,982

(22) Filed: Apr. 27, 2010

(65) Prior Publication Data

US 2011/0261942 A1  Oct. 27, 2011

(51) Int. Cl.
*H04M 3/42* (2006.01)
(52) U.S. Cl. ........... 379/201.01; 379/211.02; 455/404.2; 455/414.1
(58) Field of Classification Search ............. 379/201.01, 379/211.02; 455/404.2, 414.1
See application file for complete search history.

(56) References Cited

U.S. PATENT DOCUMENTS

| | | | |
|---|---|---|---|
| 5,610,970 A * | 3/1997 | Fuller et al. .................... | 455/417 |
| 2003/0003900 A1 * | 1/2003 | Goss et al. ..................... | 455/417 |
| 2006/0205436 A1 * | 9/2006 | Liu et al. ........................ | 455/560 |
| 2008/0318561 A1 * | 12/2008 | Olshansky et al. ............ | 455/417 |

* cited by examiner

*Primary Examiner* — Quynh Nguyen
(74) *Attorney, Agent, or Firm* — Merchant & Gould

(57) ABSTRACT

Device-to-device call disposition is provided. When a call is received at a first telecommunications device, a determination may be made as to whether a second device has been designated to receive a notification of the inbound call and to allow for call disposition at the second device. At the second device, the user may be notified of the incoming call at the first device, and the user may be provided with a number of options for disposing of the incoming call. While the user is positioned at a location having a wireline or wireless communications device associated with the location, and the user receives a call on his/her personal wireless device, a call to the personal wireless device may be automatically routed to the wireline or wireless device associated with the user's location (e.g., home or office).

21 Claims, 4 Drawing Sheets

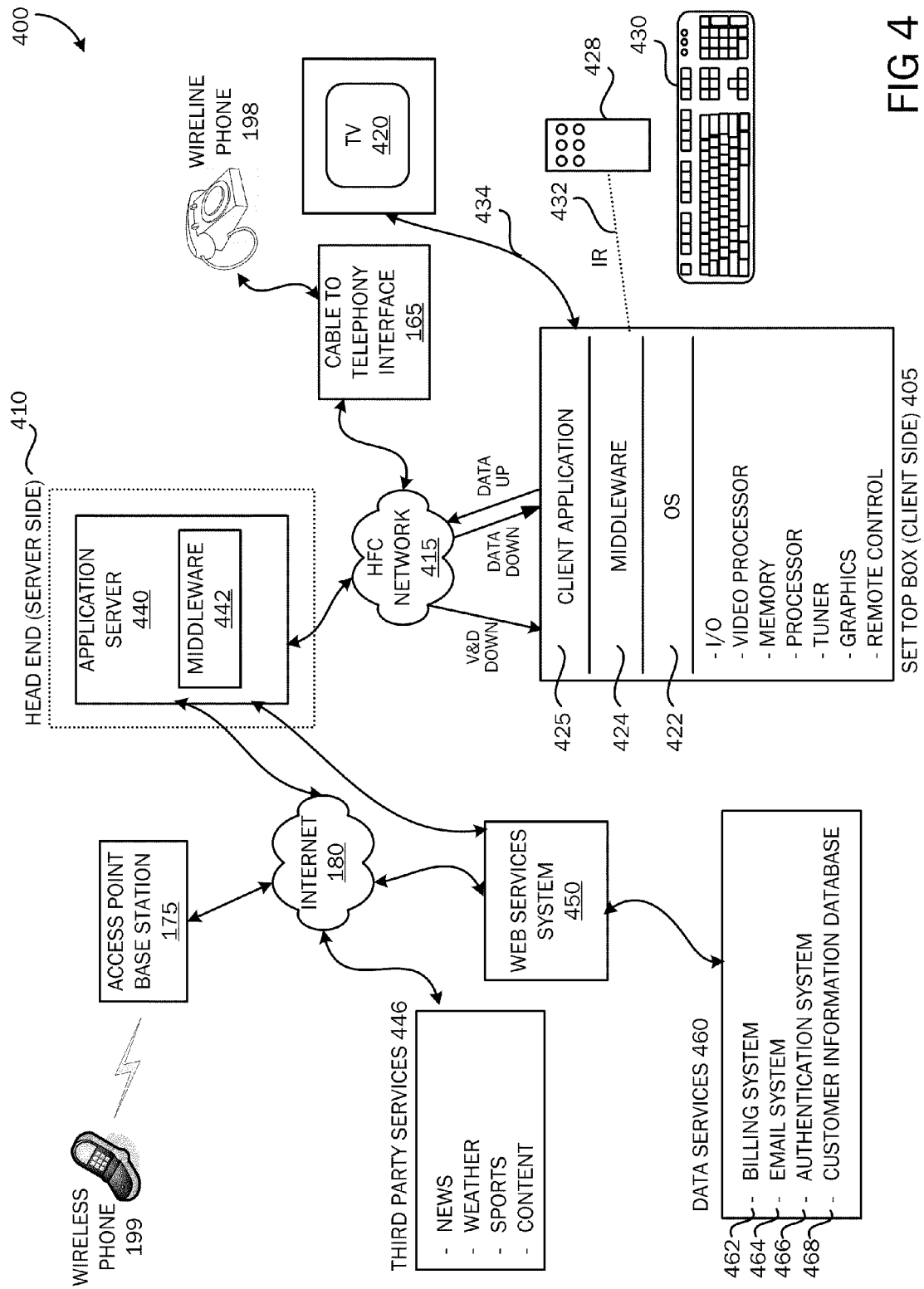

DEVICE-TO-DEVICE CALL DISPOSITION

BACKGROUND

With the advent of modern telecommunications systems, users often receive and send communications with multiple communications devices. A typical user may utilize a wireline or wireless telephone at home and/or work, and one or more other communications devices, such as wireless telephones, personal digital assistant (PDA) and the like, while away from home and/or work. With such multiple device communications environments, users often receive important calls at a receiving device while they are away from the receiving device. For example, a user may receive a number of important calls at a home wireline telephone while the user is away at work and accessible via his/her wireless or work wireline telephone. On the other hand, while the user is at home or work, he/she may receive one or more calls to his/her wireless telephone. For example, often a user may be at home or work utilizing a home or business wireline or wireless telephone only to receive a call on his/her personal wireless telephone. Such situations are inefficient, cumbersome, and even aggravating because the user might not desire to shut down the personal wireless telephone, but nonetheless would rather not receive calls to both the personal wireless telephone and the home or work wireline or wireless telephone.

It is with respect to these and other considerations that the present invention has been made.

SUMMARY

Embodiments of the present invention solve the above and other problems by providing device-to-device call disposition. According to one embodiment, when a call is received at a wireline or wireless telephone positioned at a home, office or other location, a determination may be made as to whether a second device, such as a wireless telephone, PDA or other wireline telephone device, has been designated to receive a notification of the inbound call and to allow for call disposition at the second device. At the second device, the user may be notified of the incoming call at the first device, and the user may be provided with a number of options for disposing of the incoming call.

According to another embodiment, while the user is positioned at a location having a wireline or wireless communications device associated with the location, and the user receives a call on his/her personal wireless device, a call to the personal wireless device may be automatically routed to the wireline or wireless device associated with the user's location (e.g., home or office).

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

FIG. 4 is a simplified block diagram of a cable services system architecture in which embodiments of the present invention may be implemented.

DETAILED DESCRIPTION

Figure 1:
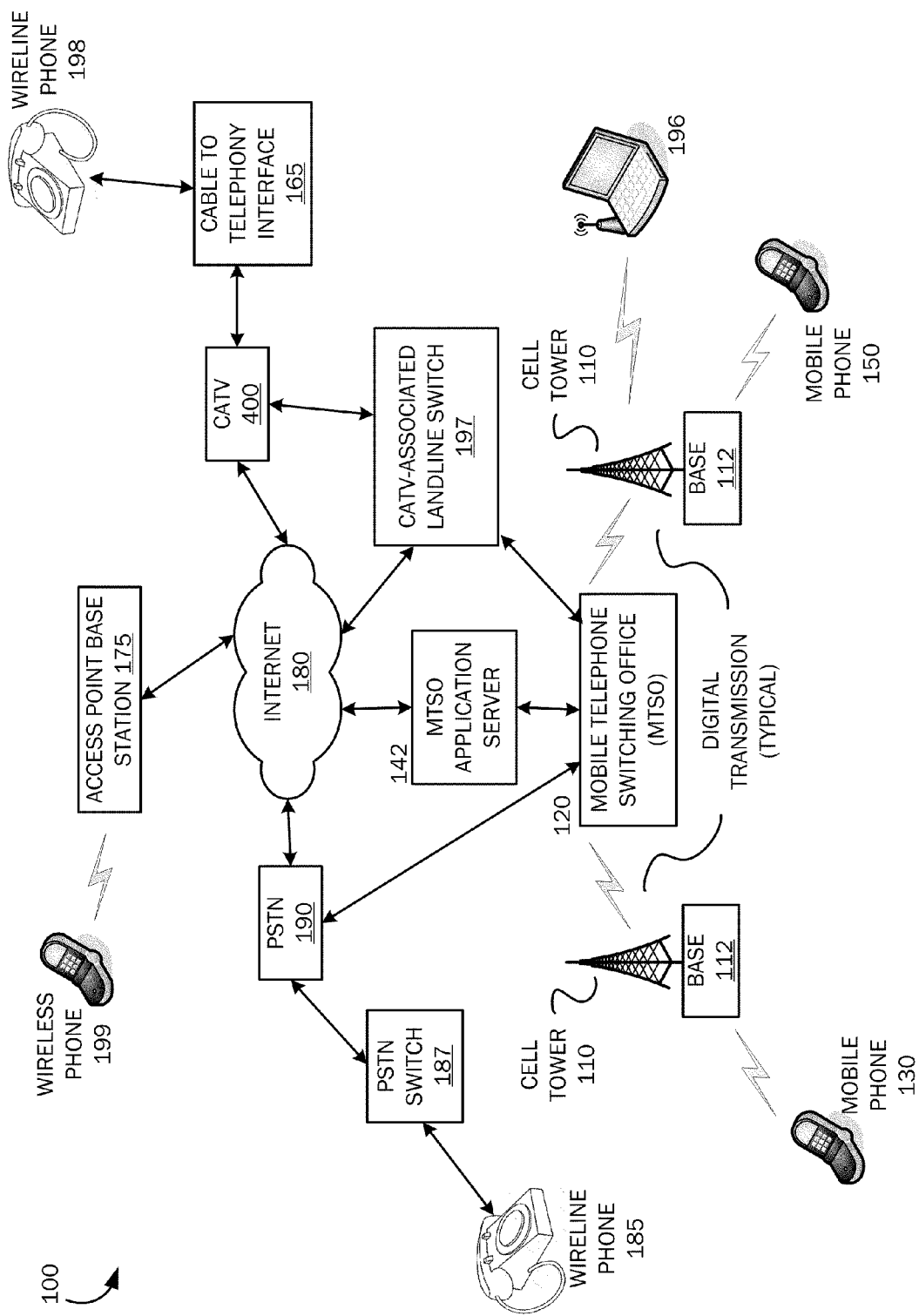
FIG. 1 is a simplified block diagram illustrating a wireless and wireline telecommunications architecture that serves as an exemplary operating environment for the present invention.

As briefly described above, embodiments of the present invention are directed to device-to-device call disposition. When a call is directed to a user at a first device, such as a wireline or wireless telephone, positioned at a home, office or other location, while the user is away, the user may be notified of the incoming call at a second device, for example, a wireless or wireline device available at the user's present location. A number of call processing options may be enabled to allow the user to dispose of the incoming call from the second device. Alternatively, if the user is positioned at the location of the first device (e.g., home or office), and the user receives a call directed to his/her wireless device (e.g., personal wireless telephone or PDA), the incoming call may be processed at and/or routed to the first device so that the user does not have to deal with the call coming into his/her personal wireless device.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is a simplified block diagram illustrating a wireless and wireline telecommunications architecture that serves as an exemplary operating environment for the present invention. The telecommunications architecture illustrated in FIG. 1 shows components of a wireless communications network, a public switched telephone network (PSTN) and a cable television services system (CATV) telecommunications network. As should be understood, the example communications/services network architecture illustrated in FIG. 1 is for purposes of illustration only and is not limiting of a variety of communications configurations that may be utilized as described herein.

Referring now to FIG. 1, wireless communication services are provided by various service provider companies through a wireless network. As is known to those skilled in the art, wireless networks/services may consist of but not be limited to cellular towers 110, base stations 112, one or more wireless telephone switching offices (hereafter referred to as "MTSO") 120, and an application server 142. As should be appreciated, wireless communications may also be accomplished via Internet Protocol (IP) based systems and wireless fidelity (Wi-Fi) based systems via distributed computing networks such as the Internet 180.

As is known to those skilled in the art, a cellular tower 110 typically consists of a steel pole or lattice structure outfitted with antennae for transmitting and receiving signals to and from wireless devices (for example, wireless phone, personal digital assistant (PDA), smart phone, etc.), other cellular towers, and the MTSO. Each cellular tower 110 may have multiple sets of antenna mounted, depending upon how many different service providers use the tower 110.

The base 112 of each cellular tower 110 may include sets of transmitters and receivers from each service provider having antennae mounted to the tower 110. As a unit, the cellular tower 110 and the base 112 form a system capable of transmitting, receiving, and managing data. This data may consist of, but not be limited to, voice, text, and/or electronic media. As is understood by those skilled in the art, wireless systems typically operate at various frequencies (e.g., across a frequency range from 700 megahertz (MHz) to 1900 MHz), depending upon which wireless technology is utilized. As should be appreciated, a synonym for a cellular tower 100 is a cellular site, as some cellular antennas may be mounted to other structures, such as buildings. According to the embodiments of the present invention, a visual voicemail (WM) system may operate across this typical network of wireless systems, and therefore in the same frequency ranges.

Referring still to FIG. 1, a wireless network may also employ the use of a wireless electronic communication devices 130,150 (e.g., wireless phone, personal digital assistant (PDA), smart phone, etc.) capable of sending and receiving communications in the same frequency range as the wireless communications system. The term "mobile or wireless device" will be used herein to describe a wireless electronic communication device capable of sending and receiving wireless communications. As is understood by those skilled in the art, wireless devices 130,150 may comprise, but are not limited to, internal circuit boards, antennae, liquid crystal displays (LCD), keyboards, microphones, speakers, and batteries. All of these components and systems making up wireless devices 130,150 work together to send, receive, and manage communications within and beyond the cellular network.

Referring still to FIG. 1, an MTSO 120 serves as a central control center for the base stations 112 operating in a given area. For example, an MTSO 120 may be configured for controlling wireless communications for a wireless service provider operating in a specified city or other suitable operating area or region. In addition to other operating functions of the MTSO, according to embodiments of the present invention, the MTSO 120 may serve as control point for determining, providing and controlling subscriber features. For example, in accordance with embodiments of this invention, a customer information database may contain data to allow a determination as to whether a particular feature or service is provisioned for a given wireless communications device account. An example of such a feature or service may be caller identification (ID), call waiting, voicemail, or visual voicemail. Thus, if a caller using wireless device 130 attempts a call to another wireless or wireline device, a customer information database may be parsed to determine which features to provision before completing the connection with a called party.

Referring still to FIG. 1, the telecommunications system 100 also includes a public switched telephone network (PSTN) 190 for allowing communications between a traditional wireline telephone 185 through a PSTN switch 187 to other telecommunications systems such as the wireless telecommunications systems described above. Also illustrated in FIG. 1 is a cable television services-based telecommunications network that enables a wireline telephone 198 to communicate with other communications networks through a cable television services system 400 via a cable to telephony interface 165 and a cable television services-associated landline switch 197 (described in further detail below with respect to FIG. 4). Also illustrated is a wireless phone 199 connected to an access point base station 175, which allows the wireless phone 199 to connect to any number of wireless, wireline, PSTN, CATV-based communications systems, and the like, as illustrated in FIG. 1. In addition, a computer 196 is illustrated connected to a MTSO 120 through a wireless communication network 110,112 for communication via a distributed computing network 180, such as the Internet, with the wireless, PSTN and cable television services system networks illustrated in FIG. 1.

According to embodiments of the present invention, each of the telecommunications systems illustrated in FIG. 1, for example, public switched telephone network, wireless network, cable television services system network, may include one or more intelligent network components for enabling and processing specialized or subscribed features for called and calling parties. According to embodiments, such intelligent network components may reside at various locations in each of the example systems. For example, for the PSTN network 190, an intelligent network component may reside in the PSTN switch 187, or an intelligent network component may reside in another location in the PSTN 190. For the cable television services system 400, an intelligent network component may reside in the cable television services-associated landline switch 197 or in another component of the cable television services system 400. For the wireless telecommunications system, the intelligent network component may similarly reside in one or more network components, for example, the MTSO 120 and/or the MTSO application server 142.

As described above, such intelligent network components may be utilized for enabling and providing specialized features and requirements for subscribers of the respective systems. For example, a user of the PSTN 190 may subscribe to various features such as call forwarding, call waiting, caller ID, and the like. When a call is received by the subscriber at the wireline telephone 185, a query may be sent to the intelligent network component to determine those features, for example, caller ID, that have been subscribed to by the user of the wireline telephone 185. After a determination is made of the subscribed to features, those features may be provisioned for incoming calls to the wireline telephone 185. For example, if a caller identification feature has been subscribed to by the user of the wireline telephone 185, then caller identification for inbound telephone calls will be provided to the user of the wireline telephone 185. Similar functionality may be enabled in the cable television services system 400 for cable television services-based communications provided to a user of the wireline telephone 198 or wireless telephone 199 through the cable television services system 400.

In the case of the wireless telecommunications system illustrated in FIG. 1, intelligent network components and systems may be deployed, for example, in the MTSO 120 or MTSO server application 142 for providing subscribed features for users of the wireless devices 130, 150 via the wireless communications system. According to one embodiment, the intelligent network components for the wireless communications network illustrated in FIG. 1 operate according to Internet protocol multimedia subsystems (IMS). As is known to those skilled in the art, IMS allows for wireless devices, such a wireless telephones 130, 150, personal digital assistants (PDA) and computers, to register with the wireless network for enabling a variety of specialized features for users of the wireless communications network.

According to embodiments, when a call is directed to a first device, for example, a wireline telephone 185, a wireline telephone 198, or wireless telephone 199, the intelligent network components of the respective systems (i.e., PSTN or CATV) associated with the called devices are queried to determine those specialized features subscribed to by the user of the devices. In the case of the present invention, if the users of those devices have subscribed to device-to-device call disposition, a notification may be made to a second device, for example, a wireless telephone 130, 150 for notifying the user presently located away from the device receiving the inbound call that the inbound call is in progress. In addition, a variety of call disposition options may be presented to the user at the second device to allow the user to know of the existence of the inbound call and to allow the user to exercise certain control over the inbound call, as described below.

Consider, for example, that the wireline telephone 185 is positioned in the home of a user of the wireless telephone 130. Consider also, for example, that a call is placed to the wireline telephone 185. According to embodiments of the present invention, when the call is placed to the wireline telephone 185, a query is sent to an intelligent network component, for example, a PSTN service control point housed at the PSTN switch 187 or at another location in the PSTN 190, and a determination is made as to whether any specialized features are associated with the called wireline telephone 185. According to embodiments, one specialized feature includes device-to-device call disposition. The intelligent network component to which the call is routed may parse a database to determine those features that are provisioned for the wireline telephone 185, and in the case of device-to-device call disposition, the intelligent network component may determine a directory number to which device-to-device call disposition should be routed and any call disposition options that should be presented at the second device. Thus, when the inbound call is received at the example wireline telephone 185, a notification of the received inbound call may be made to the user at the wireless telephone 130, and one or more call disposition options may be enabled.

As should be appreciated, the device-to-device call disposition described above may be enabled in any number of combinations of the telecommunications systems illustrated in FIG. 1. For example, an inbound call directed to the wireline telephone 198 or wireless telephone 199 operating via the CATV-based telephony system 400 may receive the same treatment as inbound calls directed to the PSTN-based wireline telephone 185. That is, when a telephone call is received at the CATV-based telephones 198, 199, an intelligent network component housed at the CATV-associated landline switch 197 or at another suitable component of the CATV system 400 may be queried to determine features provisioned for the called devices. In the case of device-to-device call disposition, described herein, an identification of a second device, for example, the wireless devices 130, 150, illustrated in FIG. 1, may be determined, and any call disposition options to be provided may likewise be determined. A notification of the inbound call may then be provided to the user at the wireless devices 130, 150, and the user may be provided with one or more call disposition options, as described below.

Similarly, the device-to-device call disposition system may be utilized between wireless devices 130, 150 of the wireless communications network portion of the system 100 illustrated in FIG. 1. For example, a given user may utilize a first wireless device 130 as a home or business device and a second wireless device 150 as a personal device. According to embodiments of the present invention, when a call is received at the first wireless device 130, the MTSO 120 and intelligent network components associated therewith, for example, an IMS system at the application server 142, may be queried to determine features associated with the called wireless device 130. In the case of device-to-device call disposition, a determination may be made as to whether a notification of the inbound call should be made to the second wireless device 150 and as to whether any call disposition options should be enabled.

According to another embodiment, if the user of a wireless device 130, 150 enters the operating proximity of another device, for example, the wireline telephone 185, wireline telephone 198 or wireless telephone 199, calls directed to the wireless devices 130, 150 may be automatically forwarded to the second devices. For example, if the second devices, for example, the wireline telephones 185, 198 are positioned in a home or business of a user of the wireless devices 130, 150, the presence of the wireless devices 130, 150 in the operational proximity of the wireline telephones 185, 198 may cause an automatic call forwarding of calls made to the wireless devices 130, 150 to the wireline devices 185, 198. For example, if the wireline telephone 185 is located in a user's residence, when the user arrives at his/her residence with his/her wireless telephone 130 on his/her person, calls made to the wireless telephone 130 may be automatically forwarded to the wireline telephone 185 so that the user does not receive calls to both devices while he or she are at home.

According to embodiments, a determination that the second device is in an operational proximity of the second first device may be made according to a variety of methods. According to one embodiment, the user of the wireless device 130 may manually notify the wireless network through the wireless device 130 that the user is in the proximity of the second device and that automatic call forwarding should now occur. According to another embodiment, a predisposition of call forwarding may be set up to automatically forward calls from the first device to the second device under prescribed conditions. For example, a predisposed call forwarding schedule may be programmed to automatically forward calls from the first device to the second device at set times, for example, between the hours of 5:00 p.m. and midnight of each day. According to another embodiment, presence data may be obtained for the first device using global positioning satellite (GPS) technology enabled for the first device, or presence data available from the wireless communications network. For example, if the first device is enabled for GPS tracking, then GPS information providing a location for the wireless device may be used to notify the associated intelligent network component of the wireless device that the wireless device is now in the operational proximity of the second device. Similarly, presence data for a wireless telephone 130, 150 may be determined from signal communications with the wireless network based on proximity of the wireless device to cellular stations 112, illustrated in FIG. 1. According to another embodiment, presence data for a WiFi-enabled wireless device 130,150,199 may be determined from signal communications with a wireless network 195, such as a home wireless network connected to a router. The router may have a certain SSID or other identifier, such as a base station MAC address. If the WiFi-enabled wireless device 130,150,199 is within proximity to the router and is able to receive signal communications, software on the device may make a determination that the device is at a specified location; in this example, at home. According to yet another embodiment, a determination may be made based on calendaring information for the user of the wireless device 130, 150. For example, if calendaring information available for the user of the wireless device 130, 150 shows the user will be in the same location as the second device, for example, the wireline device 185 at a set date/time, then calls to the wireless device 130, 150 may be automatically forwarded to the second device during the set date/time.

As described above, when a call is received at a first device for which device-to-device call disposition features are enabled, a notification to a second designated device may be made to alert a called party not in the presence of the first device that the incoming call is being received and to provide the called party with one or more call disposition options. A call disposition application may be deployed on the wireless device 130, 150 for processing incoming call notifications and for providing one or more call disposition options, as described herein. According to one embodiment, a simple notification of the inbound call at the first device may be received without enabling any call disposition options. For example, a flashing light on the second device, a tone emitted from the second device or a simple display notification may be utilized to allow the called party at the second device to know of the existence of the inbound call at the first device.

Figure 2:
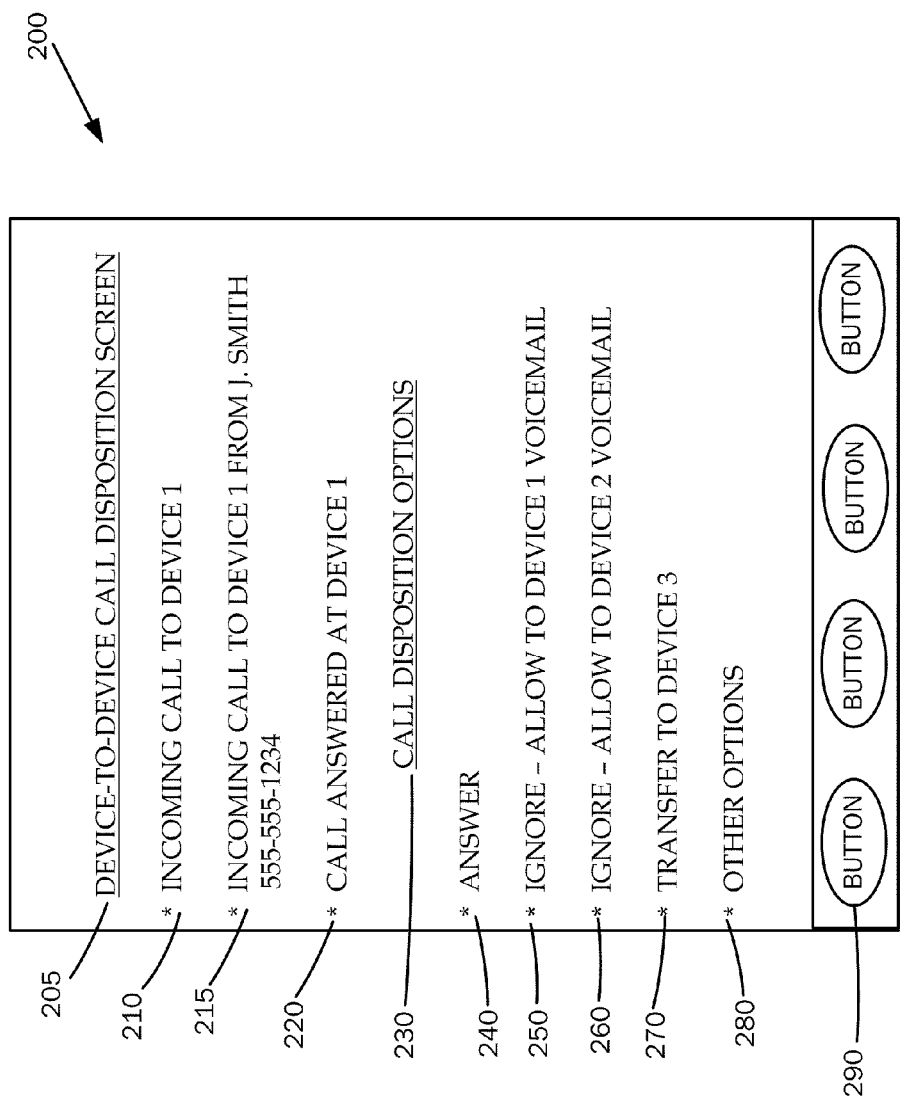
FIG. 2 is a simplified block diagram illustrating an interactive user interface for notifying a user of an incoming call and for providing call disposition options.

According to other embodiments, a variety of richly displayed call information and call disposition options may be provided to the called party at the second device. FIG. 2 is a simplified block diagram illustrating an interactive user interface for notifying a user of an incoming call and for providing call disposition options. The user interface 200 is illustrative of a screen display that may be presented to a user at a second device at which a notification of an inbound telephone call received at a first device is made. As illustrated in FIG. 2, a variety of call notification information may be provided. For example, the notification 210 may simply notify the called party that an incoming call to a first device is being received.

A notification 215 may notify the called party of the incoming call to the first device and may provide the called party with caller identification information about the calling party. As should be appreciated, if the user subscribes to caller identification information on the first or second devices, then caller identification information may be provided as part of the notification process. Calling party information (e.g., calling party name, phone number, etc.) may also be provided by an on-device address book. As illustrated in FIG. 2, other notification information may similarly be provided. For example, the notification 220 notifies the called party that the incoming call to the first device has been answered. For example, another party at the location of the first device may have answered the call, but the user may have subscribed to a service that notifies the user at the second device even when a call made to the first device has been answered. As should be understood, the notifications illustrated in FIG. 2 are for purposes of example only and are not limiting of the many different types of notification that could be displayed. For example, a notification may be made that the incoming call to the first device was rolled to a voicemail service associated with the first device, or a notification may be made that the inbound call to the first device was automatically forwarded to a third device as prescribed by the user of the first device.

Referring still to FIG. 2, in addition to providing the called party with notifications about the incoming telephone call to the first device, a number of call disposition options 230 may be presented to the called party. For example, an answer option 240 may allow the user to simply answer the call coming in to the first device. An ignore option 250 is illustrated for allowing the user to ignore the inbound call directed to the first device and allow the call to proceed to a voicemail platform associated with the first device. An ignore option 260 is illustrated for allowing the called party to ignore the call, but to direct the call to a voicemail platform associated with the second device, for example, the user's wireless telephone 130. A transfer option 270 is illustrated for allowing the user to selectively transfer the incoming call to yet a third device. For example, the user may desire to transfer the call coming into the first device to a third device such as a wireline telephone located at the user's office. Other options 280 may be provided for allowing the user to dispose of the call according to any available call processing option that may be utilized according to the user's features subscriptions for the first and second devices.

As should be appreciated, the call disposition options enabled for the first and second devices may require one or more call processing flows to take place upon selection of one or more of the available call disposition options. For example, if a user selects the answer option 240 so that the incoming call to the first device, for example, the wireline telephone 185 at the user's home may be answered at the second device, for example, the user's wireless telephone 130, appropriate signaling from the second device must be accomplished to cause a forwarding of the inbound call to the second device. For example, upon selection of the answer option 240, a signal from the wireless telephone 130 through the base station 112 to the MTSO 120 may be accomplished, followed by signaling to the PSTN 190 and on to the PSTN 187 to establish a communication from the original calling party to the second device at which the user may be reached. According to embodiments, signaling between a device and a network may be performed via Internet Protocol (IP), via SMS messaging, or via traditional cellular signaling. Operation of signaling between devices such as the wireless telephone 130 through the mobile telephone switching office 120 for connecting a call from the original calling party is well known to those skilled in the art and will not be described in further detail herein. As should be appreciated, similar connections between calling and called parties are likewise known to those skilled in the art via the other telecommunications systems illustrated and described herein, for example, telephone calls made via the CATV 400.

Figure 3:
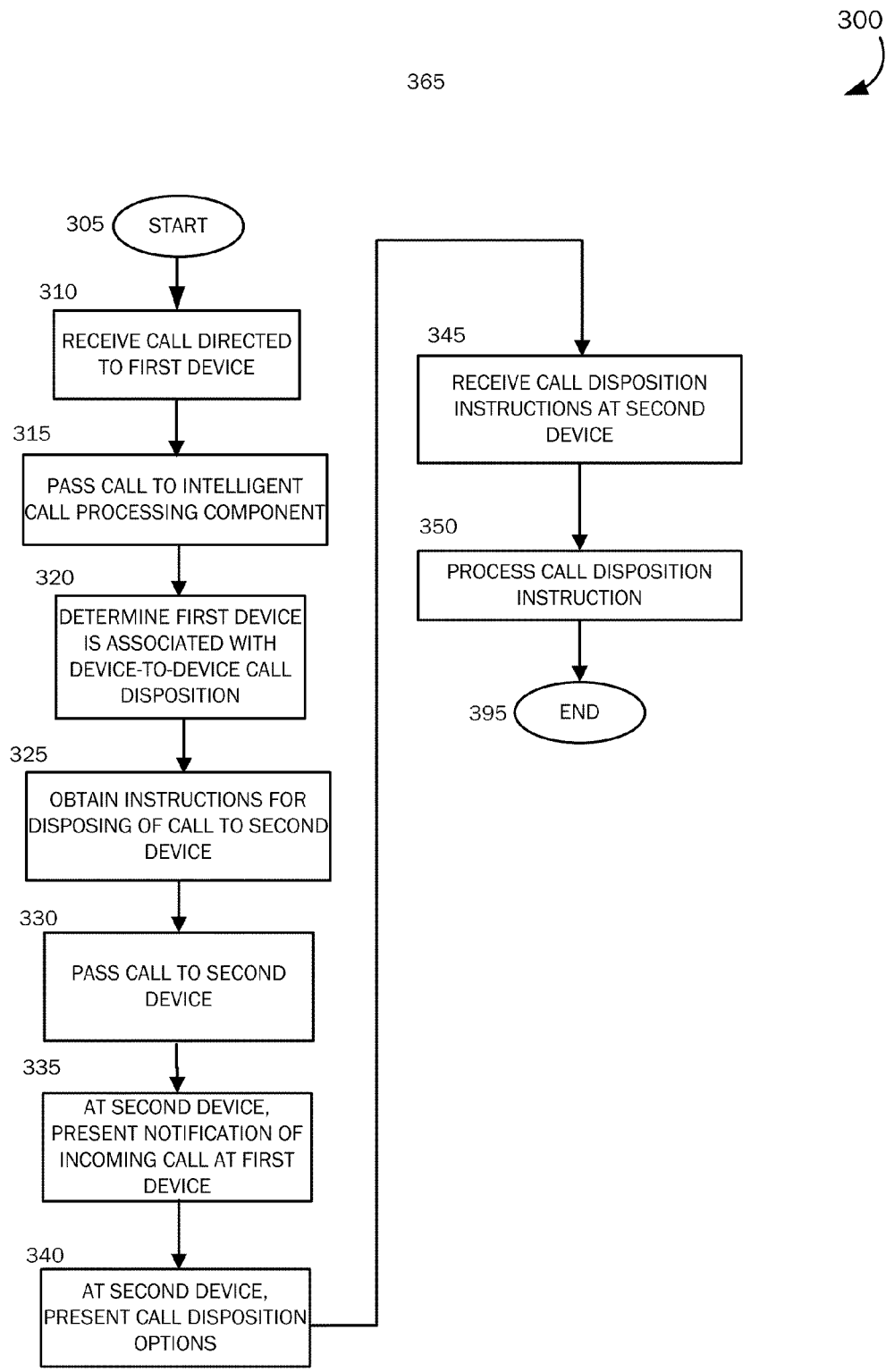
FIG. 3 is a flow diagram showing an illustrative routine for device-to-device call disposition processing.

FIG. 3 is a flow diagram showing an illustrative routine for device-to-device call disposition processing. For purposes of description of the routine 300 illustrated in FIG. 3, consider an example calling scenario in which an incoming call is received at a wireline telephone 185 operated via a public switched telephone network 190 or to a wireline telephone 198 operated via a cable television services system 400 and consider that a user of one of those two wireline devices is presently located away from the wireline devices but is accessible via a wireless telephone 130, 150.

The routine 300 begins at start operation 305 and proceeds to operation 310 where a call is received directed to a first device, for example, the wireline telephones 185, 198 located at the called party's home, business, or other location. At operation 315, based on the dialed digits for the incoming call, the call is passed to an intelligent network component, for example, a service control point of the PSTN 190 via the PSTN switch 187, or to an intelligent network component of the CATV 400 via the CATV-associated landline switch 197. At one of the respective intelligent network components, a database is queried with the telephone directory number associated with the called device. Based on the database query, a feature set subscribed to by the owner/user of the called device is located to determine those features subscribed to by the user of the called device. For example, if the user subscribes to a caller identification feature, then caller identification information will be presented at the called device for the incoming call.

According to embodiments of the present invention, at operation 320 a determination is made that the called first device is associated with a device-to-device call disposition feature. At operation 325, as part of the database query at the intelligent network component, instructions are obtained for disposing of the call at a second device. For example, a telephone directory number of the second device may be obtained, and any call disposition options, such as those illustrated and described with respect to FIG. 2 above, are likewise obtained.

At operation 330, the incoming call is passed to the second device, for example, the wireless telephone 130 for call disposition by the user of the second device. As described above with reference to FIG. 2, if the instructions for device-to-device call disposition obtained for the incoming call are simply to notify the called party at the second device of the existence of the incoming call, then a communication between the calling party and the called party at the second device need not be accomplished. That is, at operation 335, appropriate signaling to the second device to cause a desired notification, for example, a notification 210, 215, 220 illustrated in FIG. 2, or a simple audible or visual indication, may be accomplished.

If the user of the called device has subscribed to one or more call disposition options, then the call disposition options, for example, options 240-280 illustrated in FIG. 2, may be presented to the called party at the second device at operation 340. At operation 345, if the called party at the second device selects one of the presented call disposition options, signaling associated with the selected call disposition option is passed back through the appropriate telecommunications networks, for example, from the wireless telephone 130 through the wireless station 112 through the MTSO 120 through the PSTN 190, and so on, in order to pass the call disposition instruction back to the appropriate intelligent network component for processing the call in the accordance with the instruction.

At operation 350, the call disposition instructed received from the called party is processed. For example, if the user selects the ignore option 250, then signaling will be returned to the intelligent network component controlling and presently processing the inbound call to direct the appropriate switch, for example, the PSTN switch 187 or the CATV-associated landline switch 197, to allow the incoming call to be passed to a voicemail platform associated with the first device. For another example, if the call disposition instruction is the transfer option 270, then appropriate signaling will be sent back through the telecommunications networks to the switch presently handling the incoming call, and that instruction will be followed to transfer the incoming call to a previously designated transfer directory number. After any required notification for the incoming call is made, and after processing any selected call disposition options, the routine ends at operation 395.

As described above, according to another embodiment, if the user of the second device, for example, the wireless telephone 130, 150, returns to the operational proximity of the first device, an automatic call forwarding of calls received to the second device may be made so that such incoming calls may be forwarded to the first device. For example, if a user of the wireless telephone 130 returns home at the end of a work day, all calls placed to the wireless telephone 130 may be automatically forwarded to the wireline telephone 185 located in the user's home. As described above, one of a number of methods for determining that the first device is in the operational proximity of the second device may be utilized.

As described above, according to embodiments, inbound calls requiring device-to-device call disposition and automatic call forwarding to in-proximity devices may be performed in association with a cable television services system (CATV) network. FIG. 4 is a simplified block diagram of a cable services system architecture in which embodiments of the present invention may be implemented. As illustrated in FIG. 4, digital and analog video programming, information content and interactive television services are provided via a hybrid fiber coax (HFC) network 415 to a television set 420 for consumption by a cable television/services system customer. As is known to those skilled in the art, HFC networks 415 combine both optical fiber and coaxial cable lines. Typically, optical fiber runs from the cable head end 410 to neighborhoods of 500 to 2,000 customers. Coaxial cable runs from the optical fiber feeders to each customer. According to embodiments of the present invention, the functionality of the HFC network 415 allows for efficient bidirectional data flow between the client-side set-top box 405 and the server-side application server 440 of the present invention.

According to embodiments of the present invention, the CATV system 400 is in the form of a distributed client-server computing system for providing video and data flow across the HFC network 415 between server-side services providers (e.g., cable television/services providers) via a server-side head end 410 and a client-side customer via a client-side set-top box (STB) functionally connected to a customer receiving device, such as the television set 420. As should be appreciated, a STB 405 may be a physical electronic device as described above, or may be integrated into a device containing a MAC address, such as a television 455.

As is understood by those skilled in the art, modern CATV systems 400 may provide a variety of services across the HFC network 415 including traditional digital and analog video programming, telephone services, high speed Internet access, video-on-demand, and information services.

On the client side of the CATV system 400, digital and analog video programming and digital and analog data are provided to the customer television set 420 via the set-top box (STB) 405. Interactive television services that allow a customer to input data to the CATV system 400 likewise are provided by the STB 405. As illustrated in FIG. 4, the STB 405 is a multipurpose computing device having a computer processor, memory and an input/output mechanism. The input/output mechanism receives input from server-side processes via the HFC network 415 and from customers via input devices such as the remote control device 428 and the keyboard 430. The remote control device 428 and the keyboard 430 may communicate with the STB 405 via a suitable communication transport such as the infrared connection 432. The STB 405 also includes a video processor for processing and providing digital and analog video signaling to the television set 420 via a cable communication transport 434. A multi-channel tuner is provided for processing video and data to and from the STB 405 and the server-side head end system 410, described below.

The STB 405 also includes an operating system 422 for directing the functions of the STB 405 in conjunction with a variety of client applications 426. For example, if a client application 425 requires a news flash from a third-party news source to be displayed on the television 420, the operating system 422 may cause the graphics functionality and video processor of the STB 405, for example, to output the news flash to the television 420 at the direction of the client application 426 responsible for displaying news items.

Because a variety of different operating systems 422 may be utilized by a variety of different brands and types of set-top boxes, a middleware layer 424 is provided to allow a given software application to be executed by a variety of different operating systems. According to an embodiment of the present invention, the middleware layer 424 may include a set of application programming interfaces (API) that are exposed to client applications 426 and operating systems 422 that allow the client applications to communicate with the operating systems through common data calls understood via the API set. As described below, a corresponding middleware layer is included on the server side of the CATV system 400 for facilitating communication between the server-side application server and the client-side STB 405. According to one embodiment of the present invention, the middleware layer 442 of the server-side application server and the middleware layer 424 of the client-side STB 405 format data passed between the client side and the server side according to the Extensible Markup Language (XML), or other similar protocols.

The set-top box 405 passes digital and analog video and data signaling to the television 420 via a one-way communication transport 434. The STB 405 may receive video and data from the server side of the CATV system 400 via the HFC network 415 through a video/data downlink and data via a data downlink. The STB 405 may transmit data from the client side of the CATV system 400 to the server side of the CATV system 400 via the HFC network 415 via one data uplink. The video/data downlink is an "in band" downlink that allows for digital and analog video and data signaling from the server side of the CATV system 400 through the HFC network 415 to the set-top box 405 for use by the STB 405 and for distribution to the television set 420. As is understood by those skilled in the art, the "in band" signaling space operates at a variety of frequencies, for example, at frequencies between 54 and 1000 megahertz. The signaling space is generally divided into 6 megahertz channels in which may be transmitted a single analog signal or a greater number (e.g., up to ten) digital signals.

The data downlink and the data uplink, illustrated in FIG. 4, between the HFC network 415 and the set-top box 405 comprise "out of band" data links. As is understand by those skilled in the art, the "out of band" frequency range generally lies between zero and 54 megahertz. According to embodiments of the present invention, data flow between the client-side set-top box 405 and the server-side application server 440 is typically passed through the "out of band" data links. Alternatively, an "in band" data carousel may be positioned in an "in band" channel into which a data feed may be processed from the server-side application server 440 through the HFC network 415 to the client-side STB 405. Operation of data transport between components of the CATV system 400, described with reference to FIG. 4, is well known to those skilled in the art.

According to one embodiment data passed between the CATV system backend components such as the head end 410 and the CATV system front end components such as the STB 405 may be passed according to the Data Over Cable Service Interface Specification (DOCSIS). As is well known to those skilled in the art, DOCSIS provides for a mechanism for data transport over a cable system such as the CATV 400, illustrated in FIG. 4. Among other things, DOCSIS allows for the passing of digital communications and Internet connectivity over an HFC network 415.

Referring still to FIG. 4, the head end 410 of the CATV system 400 is positioned on the server side of the CATV system and includes hardware and software systems responsible for originating and managing content for distributing through the HFC network 415 to client-side STBs 405 for presentation to customers via televisions 420. As described above, a number of services may be provided by the CATV system 400, including digital and analog video programming, interactive television services, telephone services, video-on-demand services, targeted advertising, and provision of information content.

The application server 440 is a general-purpose computing system operative to assemble and manage data sent to and received from the client-side set-top box 405 via the HFC network 415. As described above with reference to the set-top box 405, the application server 440 includes a middleware layer 442 for processing and preparing data from the head end of the CATV system 400 for receipt and use by the client-side set-top box 405. For example, the application server 440 via the middleware layer 442 may obtain data from third-party services 446 via the Internet 440 for transmitting to a customer through the HFC network 415 and the set-top box 405. For example, a weather report from a third-party weather service may be downloaded by the application server via the Internet 444. When the application server 440 receives the downloaded weather report, the middleware layer 442 may be utilized to format the weather report for receipt and use by the set-top box 405. According to one embodiment of the present invention, data obtained and managed by the middleware layer 442 of the application server 440 is formatted according to the Extensible Markup Language and is passed to the set-top box 405 through the HFC network 415 where the XML-formatted data may be utilized by a client application 426 in concert with the middleware layer 424, as described above. As should be appreciated by those skilled in the art, a variety of third-party services data, including news data, weather data, sports data and other information content may be obtained by the application server 440 via distributed computing environments such as the Internet 444 for provision to customers via the HFC network 415 and the set-top box 405.

According to embodiments of the present invention, the application server 440 obtains customer profile data from services provider data services 460 for preparing a customer profile that may be utilized by the set-top box 405 for tailoring certain content provided to the customer. According to an embodiment of the present invention, a customer profile may include communications applications provisioned on networked STBs, as well as, designations of individual STBs in a home, business or facility (e.g., "kitchen STB," "bedroom STB," "office STB," and the like).

As illustrated in FIG. 4, the services provider data services 460 include a number of services operated by the services provider of the CATV system 400 which may include data on a given customer. For example, a billing system 462 may include information such as a customer's name, street address, business identification number, Social Security number, credit history, and information regarding services and products subscribed to by the customer. An electronic mail system 464 may contain information such as electronic mail addresses, high-speed Internet access subscription information and electronic mail usage data. An authentication system 466 may include information such as secure user names and passwords utilized by customers for access to network services. The customer information database 468 may include general information about customers such as place of employment, business address, business telephone number and demographic information such as age, gender, educational level, and the like. As should be understood by those skilled in the art, the disparate data services systems 462, 464, 466, 468 are illustrated as a collection of data services for purposes of example only. The example data services systems comprising the data services 460 may operate as separate data services systems, which communicate with a web services system (described below) along a number of different communication paths and according to a number of different communication protocols.

Referring still to FIG. 4, a web services system 450 is illustrated between the application server 440 and the data services 460. According to embodiments of the present invention, the web services system 450 serves as a collection point for data requested from each of the disparate data services systems comprising the data services 460. When the application server 440 requires customer profile data from one or more of the data services 460 for preparation or update of a customer profile, the application server 440 passes a data query to the web services system 450. The web services system formulates a data query to each of the available data services systems for obtaining any available data for a given customer as identified by a set-top box identification associated with the customer. The web services system 450 serves as an abstraction layer between the various data services systems and the application server 440. That is, the application server 440 is not required to communicate with the disparate data services systems, nor is the application server 440 required to understand the data structures or data types utilized by the disparate data services systems. The web services system 450 is operative to communicate with each of the disparate data services systems for obtaining necessary customer profile data. The customer profile data obtained by the web services system is assembled and is returned to the application server 440 for ultimate processing via the middleware layer 442, as described above.

As illustrated in FIG. 4, the wireline telephone 198 may connect to the CATV 400 via a cable to telephony interface 165 (e.g., embedded multimedia terminal adapter (eMTA), multimedia terminal adapter (MTA)). The cable to telephony interface 165 allows for analog signallying at a customer's premises to be converted into digital signaling, which is sent over a cable connection to a switching center, where it is connected to any of a number of communications systems, as is illustrated in FIG. 1. A wireless telephone 199 may connect to the CATV 400 via an access point base station 175, or via a WiFi base station. According to one embodiment, when a wireless telephone 130, 150 is in proximity to the CATV-enabled devices 198, 199 and calls to the wireless devices 130, 150 are automatically forwarded to the CATV-enabled devices, call notification and/or call disposition information directed to the CATV-enabled devices may be displayed on the television 420 via the STB 405.

As described herein, methods and systems are provided for allowing a user of a wireless communication device or other suitable communication device to receive and review transcribed voicemail messages in text format and for allowing the user to access associated audio versions of transcribed voicemail messages without the need for accessing a voicemail system to cycle through various prompts and stored voicemail messages. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of device-to-device call disposition, comprising:
   receiving a call at a first telecommunications device;
   determining whether the first telecommunications device is in an operational proximity of a second telecommunications device;
   if the first telecommunications device is in the operational proximity of the second telecommunications device, automatically forwarding the call received at the first telecommunications device to the second telecommunications device; and
   if the first telecommunications device is not in the operational proximity of the second telecommunications device:
      determining whether device-to-device call disposition is required for the received call;
      passing call disposition instructions to the second telecommunications device via an intelligent network component associated with the second telecommunications device, wherein the intelligent network component includes an internet protocol multimedia subsystem (IMS) application associated with the second telecommunications device; and
      at the second telecommunications device, presenting a notification of the call received at the first telecommunications device.

2. The method of claim 1, wherein determining whether device-to-device call disposition is required for the received call includes querying a database of features associated with the first telecommunications device.

3. The method of claim 2, wherein querying the database of features associated with the first telecommunications device includes querying the database of features via the intelligent network component associated with the first telecommunications device.

4. The method of claim 3, wherein querying the database of features associated with the first telecommunications device includes obtaining device-to-device call disposition instructions from the database of features associated with the first telecommunications device.

5. The method of claim 1, wherein presenting the notification of the call received at the first telecommunications device includes presenting a visual indication at the second telecommunications device of the call received at the first telecommunications device.

6. The method of claim 1, wherein presenting the notification of the call received at the first telecommunications device includes presenting at the second telecommunications device an audible notification of the call at the first telecommunications device.

7. The method of claim 1, wherein presenting the notification of the call received at the first telecommunications device includes presenting a textual notification at the second telecommunications device of the call at the first telecommunications device.

8. The method of claim 7, wherein presenting the textual notification of the call at the first telecommunications device includes presenting caller identification information at the second telecommunications device for the call at the first telecommunications device.

9. The method of claim 7, at the second telecommunications device, presenting one or more call disposition options for disposing of the call at the first telecommunications device.

10. The method of claim 9, wherein presenting one or more call disposition options includes presenting an option of answering at the second telecommunications device the call at the first telecommunications device.

11. The method of claim 9, wherein presenting one or more call disposition options includes presenting an option of ignoring the call at the first telecommunications device.

12. The method of claim 11, wherein presenting one or more call disposition options includes presenting the option of ignoring the call at the first telecommunications device and allowing the call at the first telecommunications device to be routed to a voicemail platform associated with the first telecommunications device.

13. The method of claim 11, wherein presenting one or more call disposition options includes presenting the option of ignoring the call at the first telecommunications device and allowing the call at the first telecommunications device to be routed to a voicemail platform associated with the second telecommunications device.

14. The method of claim 9, wherein presenting one or more call disposition options includes presenting an option of transferring the call at the first telecommunications device to a third telecommunications device.

15. The method of claim 9, further comprising
receiving a call disposition instruction at the second telecommunications device; and
processing the call disposition instruction received at the second telecommunications device.

16. The method of claim 15, wherein receiving the call disposition instruction at the second telecommunications device includes receiving the call disposition instruction at the second telecommunications device via the intelligent network component associated with the second telecommunications device.

17. A method of automatic call forwarding and device-to-device call disposition from a first telecommunications device to a second telecommunications device, comprising:
receiving a call at the first telecommunications device;
determining whether the first telecommunications device is in an operational proximity of the second telecommunications device, including querying an intelligent network component associated with the first telecommunications device to determine whether the first telecommunications device is within a prescribed physical range of the second telecommunications device;
if the first telecommunications device is in the operational proximity of the second telecommunications device, automatically forwarding the call received at the first telecommunications device to the second telecommunications device; and
if the first telecommunications device is not in the operational proximity of the second telecommunications device:
querying a database of features associated with the first telecommunications device via the intelligent network component associated with the first telecommunications device to determine whether device-to-device call disposition is required for the received call;
passing call disposition instructions to the second telecommunications device;
at the second telecommunications device, presenting a notification of the call received at the first telecommunications device;
receiving a call disposition instruction at the second telecommunications device; and
processing the call disposition instruction received at the second telecommunications device.

18. The method of claim 17, wherein determining whether the first telecommunications device is in the operational proximity of the second telecommunications device includes determining whether the call received at the first telecommunications device is received during a time prescribed for automatically forwarding calls received at the first telecommunications device to the second telecommunications device.

19. The method of claim 17, wherein determining whether the first telecommunications device is in the operational proximity of the second telecommunications device includes determining from a global positioning satellite system associated with the first telecommunications device whether the first telecommunications device is within the prescribed physical range of the second telecommunications device.

20. The method of claim 17, wherein determining whether the first telecommunications device is in the operational proximity of the second telecommunications device includes determining whether calendaring information for a user of the first and second telecommunications devices indicates the user will be in a location of the second telecommunications device at a prescribed time.

21. A non-transitory computer readable medium containing computer executable instructions which when executed by a computer perform a method of device-to-device call disposition, comprising:
receiving a call at a first telecommunications device;
determining whether the first telecommunications device is in an operational proximity of a second telecommunications device, including querying an intelligent network component associated with the first telecommunications device to determine whether the first telecommunications device is within a prescribed physical range of the second telecommunications device;
if the first telecommunications device is in the operational proximity of the second telecommunications device, automatically forwarding the call received at the first telecommunications device to the second telecommunications device; and
if the first telecommunications device is not in the operational proximity of the second telecommunications device:
querying a database of features associated with the first telecommunications device via the intelligent network component associated with the first telecommunications device to determine whether device-to-device call disposition is required for the received call;
passing call disposition instructions to the second telecommunications device;
at the second telecommunications device, presenting a notification of the call received at the first telecommunications device;
receiving a call disposition instruction at the second telecommunications device; and
processing the call disposition instruction received at the second telecommunications device.

* * * * *